July 22, 1958     G. BONMARTINI     2,844,399
ROTARY JOINT
Filed Aug. 3, 1955
*Fig.1*
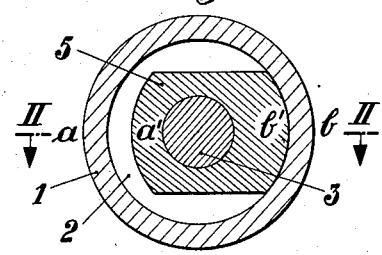
*Fig.3*
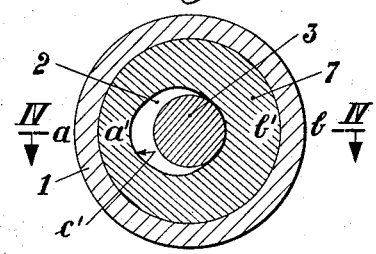
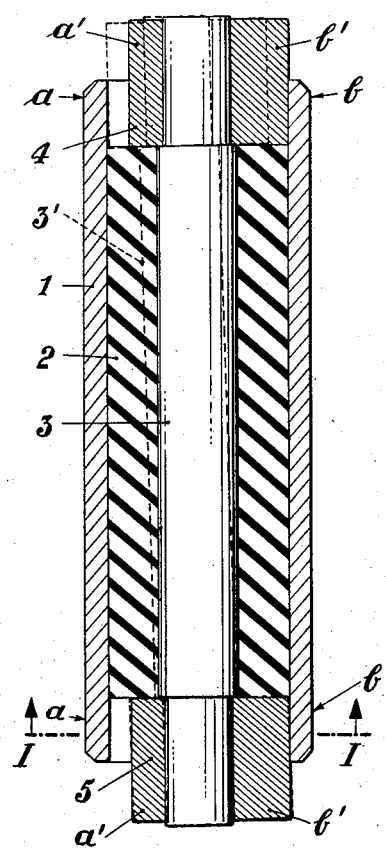
*Fig.2*
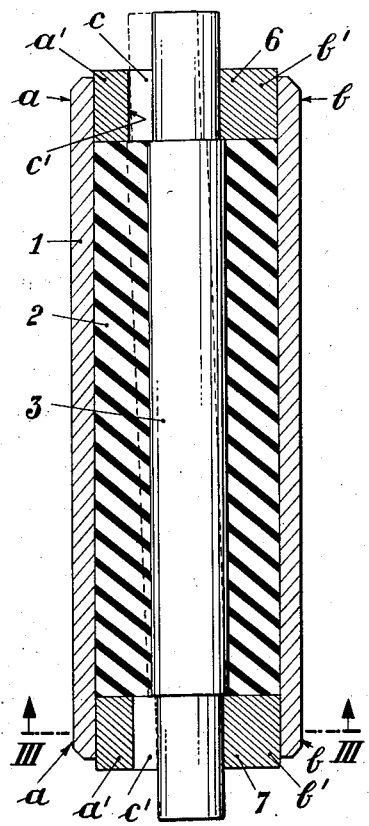
*Fig.4*

United States Patent Office

2,844,399
Patented July 22, 1958

2,844,399

ROTARY JOINT

Giovanni Bonmartini, Rome, Italy, assignor to "EST" Etablissement Sciences Techniques, Vaduz, Liechtenstein, a Liechtenstein company Application August 3, 1955, Serial No. 526,212

Claims priority, application Italy June 30, 1955

4 Claims. (Cl. 287—85)

The present invention relates to rotary joints and more particularly to an improvement in or relating to rotary elastic joints, of the type comprising: a substantially rigid outer shell; a substantially rigid spindle, mounted within said shell; a sleeve made of elastic material inserted between said shell and said spindle and connected thereto so as to elastically react to any rotational or parallel relative movement of said parts. The joint also comprises members to limit the relative radially parallel movements of said rigid shell and of said rigid spindle, these members being mounted on said spindle and/or said shell so that the maximum stresses on said elastic material inserted between the aforesaid two rigid elements, the stresses being due to relative radially parallel movements of the elements, are contained within pre-established limits, and in any case under the limits for which the elastic material becomes worn and decreases in mechanical strength and elasticity.

Rotary elastic joints of this type are old in the art and known, for instance, from the U. S. Patents Nos. 1,973,214 and 2,115,994 issued to F. H. Lamb, September 11, 1934, and May 3, 1938, respectively, on the applications filed January 3, 1933, and September 10, 1935. In said patents is furthermore illustrated and described the application of joints for the bearings of a track for tracked vehicles, such as agricultural tractors and the like.

The rotary joints of this type, although giving remarkable advantages in the manufacture of endless tracks, of lifting devices, of conveyors and the like, have the drawback of allowing an excess of rotary freedom to the spindle in respect to the shell in planes containing the axis of the spindle thus producing a damaging misalignment between the several members connected by said rotary joints.

The cause of this drawback is that, in order to obtain the possibility of useful radial parallel movements of the spindle with respect to the shell, a gap between the aforesaid two members has to be provided. This gap, in the constructions of the joints known heretofore, is formed by a cylindrical clearance, having an equal value in all of the radial directions and, said clearance exists between the spindle and the shell, or between the aforecited limiting members and their radial stops.

It has now been found that the radial gap in any direction between the spindle and the shell, as existing in the constructions known up to now, is useful only in a certain sector of radial directions, while it is quite useless in the remaining sector. The elimination of the gap in said remaining sector, while in no way reducing the functions and the utility of the joint, results in the advantage that the maximum inclination which can be reached by the axis of the spindle in the bisector plane common to said sectors in respect to the axis of the shell, is substantially reduced to half of its value, correspondingly diminishing the possibility of a damaging misalignment between the elements connected by the joint.

It has been further found that the elastic material inserted between the shell and the spindle, and connected thereto, is suitably uniformly distributed about the spindle in order to allow the best distribution of the internal stresses produced by the relative rotation of the spindle and of the shell in a plane which is at right angles, or substantially at right angles, to the longitudinal axis of the shell.

The technical problem, as hereinbefore set out, has been solved according to the present invention, according to which provision is made for a rotary joint, of the above disclosed general type, wherein said limiting members are axially spaced apart from one another and wherein each of said limiting members is provided, in a common plane passing through the axis of the joint and in the same direction, a radial thickness greater than in the diametrically opposite direction, so that while a useful radial gap between the spindle and the shell is allowed in a determined direction, the useless gap in the contrary direction is practically eliminated, and therefore the damaging freedom of relative rotational movement between the spindle and the shell in said axial plane is diminished. Consequently, a track, the elements of which are connected by means of rotary joints, according to this invention shows, at maximum elongation, a substantially lesser possibility of transverse deformation; also, the rotary joint according to this invention allows the embodiment of tracks which can be mounted on spaced pulleys which are prevented from changing their spacing during their operation although allowing the portions of the track freely extending or wound between two successive pulleys of becoming elongated through the necessary amount or range under the working load stresses.

The practical effect or benefits of this mechanical feature, given the track by the use of the joints according to the present invention resides, at maximum elongation, in a lesser trend for the track to become misaligned with respect to its pulleys and particularly with respect to the teeth of the driving pulley, and therefore there results a better operation of the mechanism of track and pulleys.

The present invention is illustrated in the attached drawing, wherein:

Figure 1 is a cross-sectional view taken along the line I—I of Figure 2 of a rotary joint according to the invention;

Figure 2 is a cross-sectional view taken along the line II—II of Figure 1;

Figure 3 shows a second form of embodiment of the joint, in a cross-sectional view taken along the line III—III of Figure 4, and Figure 4 is a cross-sectional view taken along the line IV—IV of Figure 3.

With reference to Figures 1 and 2, inside a cylindrical substantially rigid shell 1 is co-axially mounted, with an interposed sleeve 2 made of vulcanized elastic rubber (or of equivalent material), a cylindrical spindle 3, at the ends of which are mounted the limiting or stop members 4 and 5, the width of which in the direction of the sector $a$ of the shell 1, is less than in the direction of the sector $b$; as it is shown in the drawing, when at rest. The limiting members are in contact with the inner surface of the shell 1, in the aforementioned sector $b$.

The elastic material 2 is of uniform or constant thickness in any direction about the spindle 3, so that when the latter swings about its axis in respect to the shell 1, the best possible subdivision of the inner stresses within the sleeve 2, is obtained.

In operation, the sprindle 3 is apt to move towards the portion $a$ of the shell 1, by a parallel movement, through a distance corresponding to the gap between the portion $a'$ of the limiting member 4 and the portion $a$ of the shell 1, while, if submitted to a moment in the plane of the drawing (Figure 2) the spindle can assume the position shown by the dotted line 3', wherein one of the limiting members (for instance the member 4) rests against the portion *a* of the shell 1, while the limiting member fixed on the other end of the spindle 3 (in this case, the member 5) rests against the portion *b* of the shell 1. The inclination of the axis of the spindle 3 in respect to the axis of the shell 1, is in this case less (and in practice equal to one-half) than the inclination which would be allowed for said axis, if the portion or sector *b'* of the limiting members 4 and 5 was equal, in a radial direction to the portion or sector *a'* of said limiting members.

Figures 3 and 4 show another form of embodiment of this invention according to which the limiting members are formed by the discs 6 and 7 fixed at the ends of the shell 1 of the joint. The spindle 3 passes through the eccentric holes *c, c'*, and has a clearance, in the plane of disc 6, towards the portion *a* of the shell 1, while no clearance is present towards the portion *b*, as the radial extension of the discs 6 and 7 is in the portion *a'* less than in the opposite portion *b'*.

The joint, in both the forms of embodiment of Figures 1, 2 and 3, 4 respectively, the elastic sleeve 2 is preferably axially pre-compressed. This pre-compression is obtained by means of the limiting members 4 and 5, and 6 and 7, respectively, in that said members pre-compress the sleeve 2, since they are forcedly fixed on the ends of the spindle 3, or against the ends of the shell 1, respectively.

The limiting members 6 and 7 of Figures 3 and 4, are constructed so as to allow a certain amount of movement for the spindle 3 in the axial plane at right angles to the planes III—III and IV—IV, respectively, so that the radial clearance of the spindle 3 is eliminated only in the direction radially of the spindle 3 toward the portion *b* of the shell 1.

I claim:

1. A rotary elastic joint for connecting link members in endless conveyors and like devices, which comprises in combination a substantially rigid elongated shell, a substantially rigid pin disposed axially in said shell, a sleeve made of elastic material interposed between said pin and said shell being mounted on the said pin and substantially filling said shell, said pin having reduced ends each defining a shoulder, the reduced ends projecting from the ends of the shell, a limiting member mounted on each reduced end of the pin, each of said limiting members being longitudinally bored axially of the joint and having a portion radial to the pin larger than a portion in a diametrically opposite direction, each of said limiting members disposed in said shell abutting along a sector of its outer surface against the inner surface of the shell and along a sector of its inner surface against the outer surface of the reduced end of said pin.

2. A rotary elastic joint for connecting link members in endless conveyors and like devices, which comprises in combination a substantially rigid cylindrical shell, a substantially rigid cylindrical pin disposed axially in said shell and having a total length greater than the length of the shell, and provided at each end with a reduced end defining a shoulder, a sleeve of elastic material interposed between said pin and said shell and mounted on said pin, said elastic sleeve having a constant thickness and having a length substantially equal to the distance between the shoulders defined by the reduced ends, the reduced ends of the pin projecting from the ends of the shell, limiting members made of rigid material each provided with a longitudinal bore and mounted one at each reduced end of the pin and partially contained in said shell, said limiting members having wall portions of different thicknesses, each of said limiting members abutting along a sector of its outer surface against the inner surface of said shell and along a sector of its inner surface against the outer surface of said reduced end of the pin.

3. A rotary elastic joint particularly for connecting link members, conveyors and similar devices, which comprises in combination a cylindrical substantially rigid shell, a substantially cylindrical pin disposed axially in said shell and having reduced ends each defining a shoulder and projecting from the ends of the said shell, a sleeve of elastic material of constant thickness interposed between said shell and said pin and mounted on said pin, a rigid limiting member provided with a longitudinal bore fixed on each reduced end of the pin and abutting against said shoulder, said longitudinal bore of the limiting member having a diameter substantially equal to the diameter of said reduced ends and the axis thereof coinciding with the axis of said pin, each limiting member having wall portions of different thicknesses, whereby the outer surface of the limiting member abuts against the inner surface of the said shell only along a predetermined sector of the inner surface of the shell while the remaining sector of the outer surface of the limiting member is spaced from the inner surface of the shell, said elastic sleeve being longitudinally compressed between said limiting members forced on the reduced ends of said pin.

4. A rotary elastic joint for connecting link members in endless tracks and like devices, which comprises in combination a cylindrical substantially rigid shell having a predetermined inner diameter, a cylindrical substantially rigid pin disposed in said shell and having reduced ends each defining a shoulder and projecting from the ends of said shell, an elastic sleeve having a constant thickness interposed between said pin and said shell and mounted on the said pin, a rigid limiting member provided with a longitudinal bore mounted on each of the reduced ends and each abutting against said shoulders, each of said limiting members having a cylindrical outer surface with a diameter substantially equal to the inner diameter of the shell and fitting snugly in said shell, each of said limiting members being provided with a longitudinal bore eccentric with respect to the outer surface of said limiting member and having a diameter greater than the diameter of said reduced ends of the pin, whereby the inner surface of each of the limiting members abuts against the outer surface of the reduced end of the pin on which it is mounted only along a sector of the inner surface of the limiting member while in the remaining sector the inner surface of the limiting member remains spaced from said outer surface of the reduced end of the pin, said elastic sleeve interposed between said pin and said shell being longitudinally compressed by the said limiting members forced in the ends of said shell.

References Cited in the file of this patent

UNITED STATES PATENTS

| 1,937,581 | Lord | Dec. 5, 1933 |
| 2,390,168 | Piot | Dec. 4, 1945 |

FOREIGN PATENTS

| 382,017 | Great Britain | Oct. 20, 1932 |

OTHER REFERENCES

Pamphlet of Lord Mfg. Co.; Erie, Pennsylvania, titled "Rubber, A New Material In Machine Design," reprinted from "Machinery"; received in Div. 52, March 29, 1933; Figure 6 illustrated. (Copy in 248–10.)